United States Patent
Paillaman et al.

(10) Patent No.: US 6,526,114 B2
(45) Date of Patent: Feb. 25, 2003

(54) REMOTE AUTOMATED NUCLEAR REACTOR JET PUMP DIFFUSER INSPECTION TOOL

(75) Inventors: Rodolfo Paillaman, Huntsville, NC (US); Diego Molpeceres Prieto, Madrid (ES)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/681,710

(22) Filed: May 24, 2001

(65) Prior Publication Data

US 2002/0080905 A1 Jun. 27, 2002

Related U.S. Application Data

(60) Provisional application No. 60/258,396, filed on Dec. 27, 2000.

(51) Int. Cl.[7] ............................................. G21C 17/003
(52) U.S. Cl. ................. 376/249; 376/245; 376/252; 376/248; 376/259; 376/258; 376/260; 376/390; 73/40.5; 73/623; 73/625; 73/644; 73/866.5; 324/220; 324/221; 324/222; 414/8; 414/618; 294/86.13; 294/86.12
(58) Field of Search ................................ 376/245, 252, 376/248, 249, 259, 258, 260, 390; 73/40.5 R, 40.5 A, 623, 625, 644, 866.5; 324/220, 221, 222; 414/8, 618; 294/86.13, 86.12

(56) References Cited

U.S. PATENT DOCUMENTS

| | | | | |
|---|---|---|---|---|
| 3,636,778 A | * | 1/1972 | Huffstetler | 73/622 |
| 3,862,578 A | * | 1/1975 | Schluter | 376/249 |
| 4,050,384 A | * | 9/1977 | Chapman | 104/138.2 |
| 4,876,506 A | * | 10/1989 | Brown et al. | 324/207.12 |
| 5,025,215 A | * | 6/1991 | Pirl | 165/11.2 |
| 5,028,381 A | * | 7/1991 | Dugue | 376/245 |
| 5,156,803 A | * | 10/1992 | Engding et al. | 376/245 |
| 5,174,165 A | * | 12/1992 | Pirl | 324/220 |
| 5,586,155 A | | 12/1996 | Erbes et al. | 376/249 |
| 5,787,137 A | | 7/1998 | Nelson, III et al. | 376/249 |
| 5,878,099 A | | 3/1999 | Burrows et al. | 376/260 |
| 6,076,407 A | | 6/2000 | Levesque et al. | 73/623 |
| 6,169,776 B1 | * | 1/2001 | Collins | 376/249 |

FOREIGN PATENT DOCUMENTS

| | | | |
|---|---|---|---|
| EP | 0040159 | * | 11/1981 |
| EP | 000471556 A | * | 2/1992 |

* cited by examiner

Primary Examiner—Michael J. Carone
Assistant Examiner—John Richardson
(74) Attorney, Agent, or Firm—Armstrong Teasdale LLP

(57) ABSTRACT

An inspection apparatus for inspecting welds in a nuclear reactor jet pump includes a probe subassembly rotatably and linearly movably coupled to a frame structure configured to attach to a top flange of the reactor pressure vessel. The probe subassembly includes a plurality of probe arms pivotably coupled to a housing, with each probe arm including a sensor. The probe arms are pivotably movable between a first position where the probe arms are parallel to a longitudinal axis of the probe subassembly, and a second position where the probe arms are at an angle to the longitudinal axis of the probe subassembly. An insertion subassembly couples to the jet pump suction inlet. The insertion subassembly is sized to receive the probe subassembly and guide the probe subassembly into the jet pump through the jet pump suction inlet.

13 Claims, 6 Drawing Sheets

REMOTE AUTOMATED NUCLEAR REACTOR JET PUMP DIFFUSER INSPECTION TOOL

CROSS REFERENCE TO RELATED APPLICATIONS

This application claims the benefit of U.S. Provisional Application No. 60/258,396 filed Dec. 27, 2000.

BACKGROUND OF INVENTION

This invention relates generally to inspection tools, and more particularly to inspection tools for examining nuclear reactor jet pump assembly welds.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus, provide the required reactor core water flow. The upper portion of the jet pump, known as the inlet mixer, is laterally positioned and supported against two opposing rigid contacts within restrainer brackets by a gravity actuated wedge. The restrainer brackets support the inlet mixer by attaching to the adjacent jet pump riser pipe. The lower portion of the jet pump, known as the diffuser, is coupled to the inlet mixer by a slip joint. The slip joint between the jet pump inlet mixer and the jet pump diffuser collar has about 0.015 inch diametral operating clearance which accommodates the relative axial thermal expansion movement between the upper and lower parts of the jet pump and permits leakage flow from the driving pressure inside the pump.

The inlet mixer and the diffuser, due to their large size, are formed by welding a plurality of cylindrical sections together. Specifically, respective ends of adjacent cylindrical sections are joined with a circumferential weld. During operation of the reactor, the circumferential weld joints may experience intergranular stress corrosion cracking (IGSCC) and irradiation assisted stress corrosion cracking (IASCC) in weld heat affected zones which can diminish the structural integrity of the jet pump.

It is important to examine the welds of the jet pump inlet mixer and diffuser periodically to determine whether any cracking has occurred. While examinations in the annulus, or region between the shroud and the pressure vessel wall, can be performed, these examinations are likely to be only partial inspections due to access limitations in the annular region of the reactor. Any examination in the annulus is hampered by the numerous components and further constrained by any shroud repair hardware present in the annulus. Thus, it is highly advantageous to perform the examination of the jet pump welds from the inside of the jet pump inlet mixer and jet pump diffuser.

It would be desirable to provide an inspection tool that is capable of performing ultrasonic and/or eddy current examinations of jet pump welds from inside the jet pump inlet mixer and diffuser in a nuclear reactor. It would also be desirable to provide an inspection tool that is remotely operable and capable of providing position information relative to fixed items within the reactor.

SUMMARY OF INVENTION

In an exemplary embodiment, an inspection apparatus for inspecting welds in a nuclear reactor jet pump fits inside the jet pump and inspects the circumferential welds in the jet pump inlet mixer and jet pump diffuser. The inspection apparatus includes a frame structure configured to attach to a top flange of the reactor pressure vessel (RPV) of the nuclear reactor. A first motor is movably coupled to the frame structure and operatively coupled to a flexible drive cable. A tool head is coupled to the flexible cable. The tool head includes a first portion coupled to a second portion by a first flexible U-joint, and a probe subassembly coupled to the second portion by a second flexible U-joint.

The frame structure includes an elongate frame member, an attachment frame member extending from one end portion of the elongate frame member, and a support wheel coupled to the other end portion of the elongate frame member. The attachment frame member is configured to attach to the top flange of the reactor pressure vessel when the reactor pressure vessel head is removed. When the inspection apparatus is installed in the RPV, the support wheel engages the side wall of the RPV. An elongate track is coupled to the elongate frame member and extends substantially the length of the frame member.

The probe subassembly includes a probe housing and a plurality of probe arms pivotably coupled to the housing at one end of each probe arm. Each probe arm includes a sensor coupled to the opposing end of the probe arm. The probe arms are pivotably movable between a first position where the probe arms are parallel to a longitudinal axis of the probe subassembly, and a second position where the probe arms are at an angle to the longitudinal axis of the probe subassembly. In the second position, the sensors contact the inner surface of the jet pump to inspect the welds. The attached sensors are ultrasonic transducer probes and/or eddy current transducer probes. The first motor rotates the drive cable around the longitudinal axis of the drive cable. This axial rotation of the drive cable causes the probe subassembly to rotate around the longitudinal axis of the tool head and moves the sensors circumferentially around the inside wall of the jet pump.

A second motor is mounted on a trolley which is movably coupled to the elongate track. The second motor moves the trolley along the track. The first motor is also mounted on the trolley. The movement of the trolley along the track moves the flexible cable and the attached tool head so as to position the tool head at various vertical heights within the reactor pressure vessel.

An insertion subassembly couples to the jet pump inlet. The insertion subassembly is sized to receive the tool head and the connected flexible drive cable and guide the tool head and flexible drive cable into the jet pump through the jet pump inlet. The insertion subassembly includes an elongate tube portion, a location cone attached to one end of the tube portion, and an attachment clamp attached to the other end of the tube portion. The attachment clamp is configured to clamp to the jet pump suction inlet. Particularly, the attachment clamp includes a plate coupled to the tube portion. The plate includes a notch sized to receive the side wall of the jet pump suction inlet. The attachment clamp further includes an engagement arm pivotably coupled to the plate and a ratchet assembly coupled to the engagement arm. The engagement arm is movable into engagement with the jet pump inlet by tightening the ratchet assembly.

The above described inspection apparatus performs ultrasonic and/or eddy current examinations of jet pump welds from inside the jet pump inlet mixer and diffuser in a nuclear reactor without having to disassemble the jet pump. Also the inspection tool is remotely operable and provides position information relative to fixed items within the reactor.

DETAILED DESCRIPTION

Figure 1:
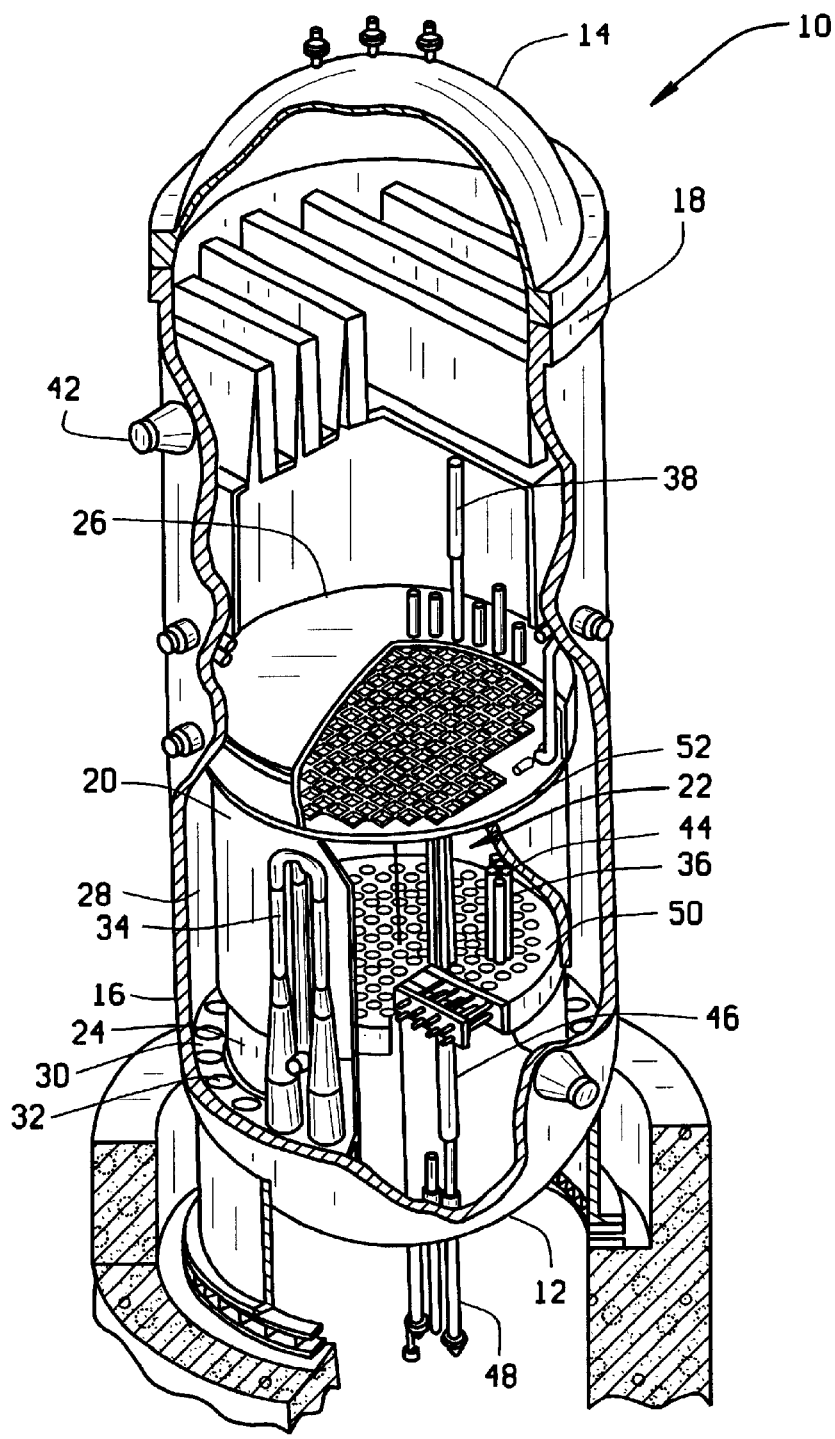
FIG. 1 is a sectional view, with parts cut away, of a boiling water nuclear reactor pressure vessel.

FIG. 1 is a sectional view, with parts cut away, of a boiling water nuclear reactor pressure vessel (RPV) 10. RPV 10 has a generally cylindrical shape and is closed at one end by a bottom head 12 and at its other end by a removable top head 14. A side wall 16 extends from bottom head 12 to top head 14. Side wall 16 includes a top flange 18. Top head 14 is attached to top flange 18. A cylindrically shaped core shroud 20 surrounds a reactor core 22. Shroud 20 is supported at one end by a shroud support 24 and includes a removable shroud head 26 at the other end. An annulus 28 is formed between shroud 20 and side wall 16. A pump deck 30, which has a ring shape, extends between shroud support 24 and RPV side wall 16. Pump deck 30 includes a plurality of circular openings 32, with each opening housing a jet pump assembly 34. Jet pump assemblies 34 are circumferentially distributed around core shroud 20.

Heat is generated within core 22, which includes fuel bundles 36 of fissionable material. Water circulated up through core 22 is at least partially converted to steam. Steam separators 38 separates steam from water, which is recirculated. Residual water is removed from the steam by steam dryers 40. The steam exits RPV 10 through a steam outlet 42 near vessel top head 14.

The amount of heat generated in core 22 is regulated by inserting and withdrawing control rods 44 of neutron absorbing material, such as for example, hafnium. To the extent that control rod 44 is inserted into fuel bundle 36, it absorbs neutrons that would otherwise be available to promote the chain reaction which generates heat in core 22. Control rod guide tubes 46 maintain the vertical motion of control rods 44 during insertion and withdrawal. Control rod drives 48 effect the insertion and withdrawal of control rods 44. Control rod drives 48 extend through bottom head 12.

Fuel bundles 36 are aligned by a core plate 50 located at the base of core 22. A top guide 52 aligns fuel bundles 36 as they are lowered into core 22. Core plate 50 and top guide 52 are supported by core shroud 20.

Figure 2:
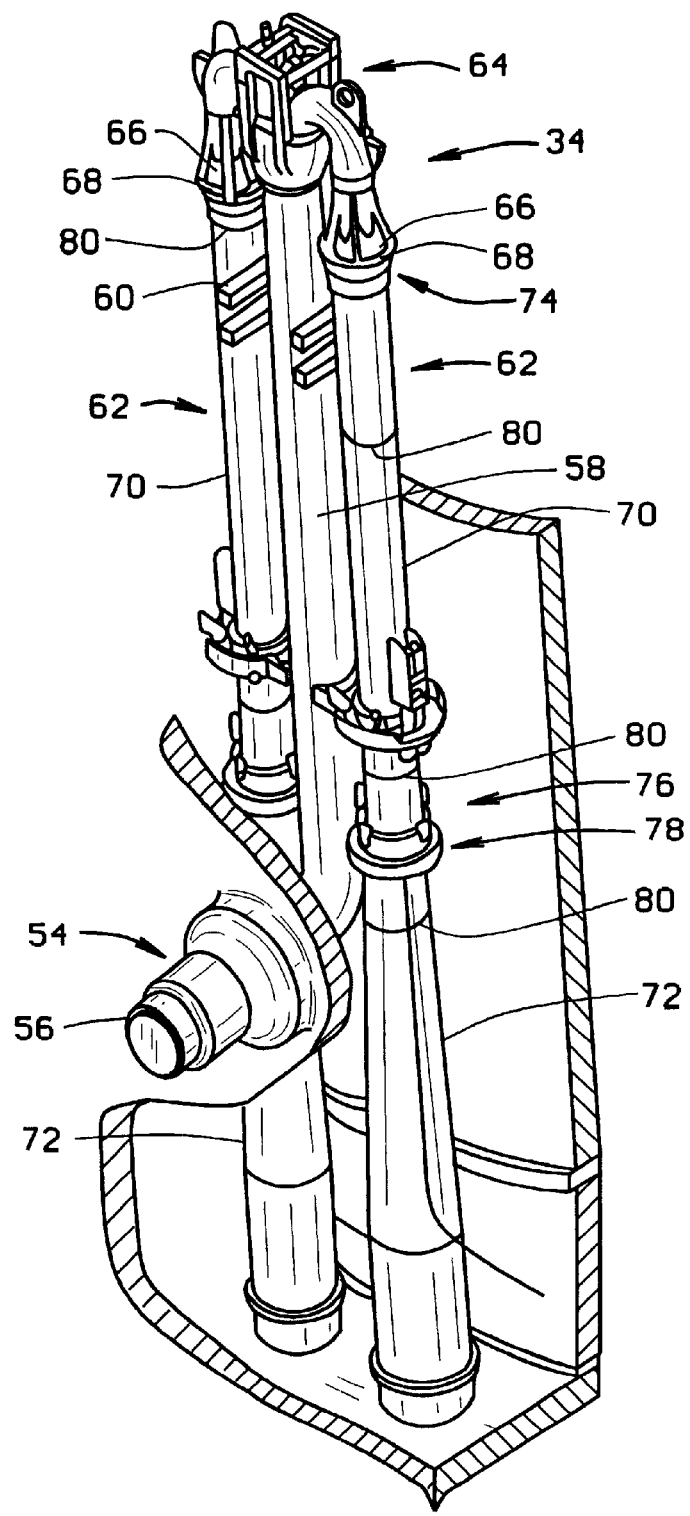
FIG. 2 is a perspective view, with parts cut away, of a jet pump assembly shown in FIG. 1.

FIG. 2 is a perspective view, with parts cut away, of jet pump assembly 34. An inlet nozzle 54 extends through side wall 16 of RPV 10 and is coupled to a jet pump assembly 34. Jet pump assembly 34 includes a thermal sleeve 56 that extends through nozzle 54, a lower elbow (only partially visible in FIG. 2), and a riser pipe 58. Riser pipe 58 extends between and substantially parallel to shroud 20 and RPV side wall 16. Riser braces 60 stabilize riser pipe 58 within RPV 10.

Riser pipe 58 is coupled to two jet pumps 62 by a transition assembly 64. Each jet pump 62 includes a jet pump nozzle 66, a suction inlet 68, an inlet mixer 70, and a diffuser 72. Jet pump nozzle 66 is positioned in suction inlet 68 which is located at a first end 74 of inlet mixer 70. Diffuser 72 is coupled to a second end 76 of inlet mixer 72 by a slip joint 78. Because of their large size, both inlet mixer 70 and diffuser 72 are formed from multiple cylindrical sections. Circumferential weld joints 80 join the cylindrical sections together.

Figure 3:
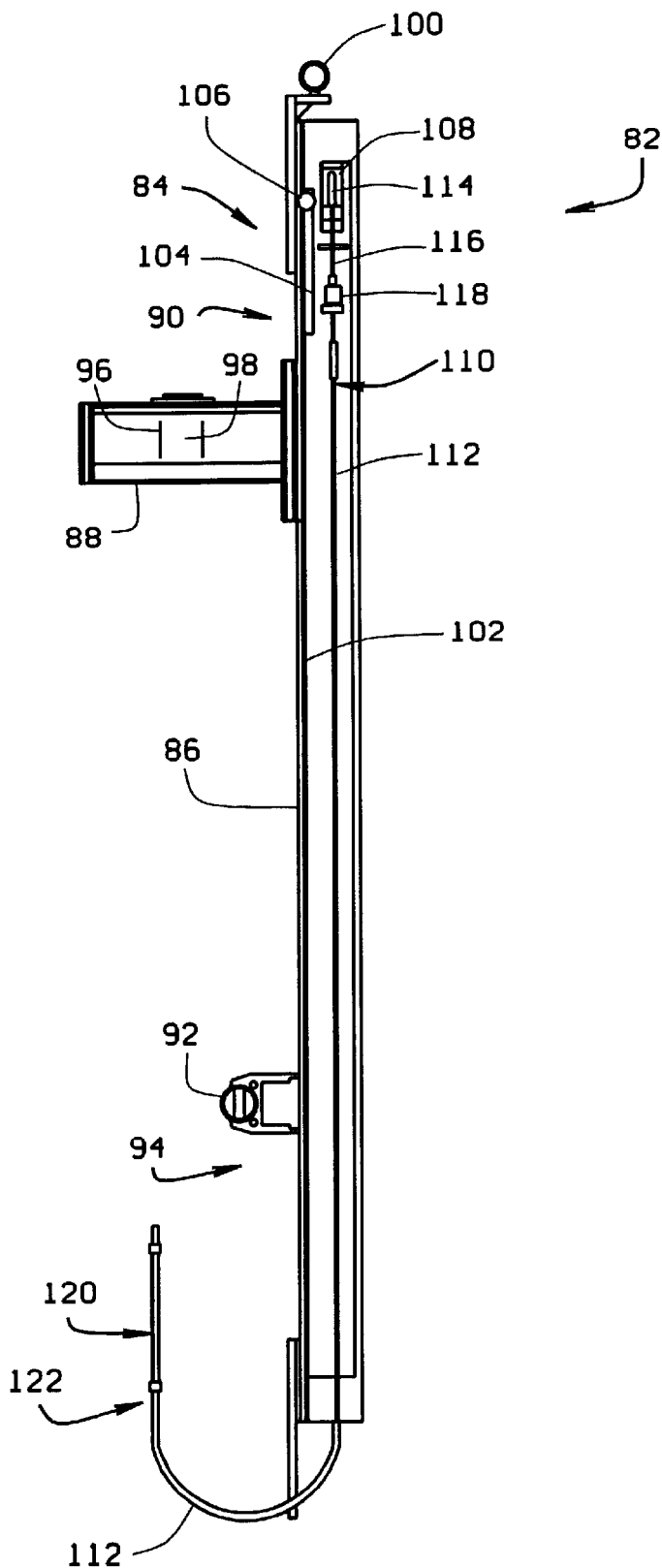
FIG. 3 is a side view of an inspection apparatus in accordance with an embodiment of the present invention.

FIG. 3 is a side view of an inspection apparatus 82 in accordance with an embodiment of the present invention. Inspection apparatus 82 includes a frame structure 84 configured to attach to top flange 18 of reactor pressure vessel 10.

Frame structure 84 includes an elongate frame member 86, an attachment frame member 88 extending from a first end portion 90 of elongate frame member 86, and a support wheel 92 coupled to a second end portion 94 of elongate frame member 86. Attachment frame member 88 is configured to attach to top flange 18 of reactor pressure vessel 10 when reactor pressure vessel top head 14 is removed. Particularly, attachment frame member 88 includes a bolt opening 96 sized to receive a RPV top head bolt 98. When inspection apparatus 82 is installed in RPV 10, support wheel 92 engages side wall 16 of RPV 10. A lifting eye 100 is attached to first end portion 90 of frame member 86 to facilitate lifting inspection apparatus 82 into position in RPV 10. An elongate track 102 is attached to frame member 86. Track 102 extends from first end portion 90 to second end portion 94 of frame member 86. A trolley 104 is movably coupled to track 102 and is movable along the length of track 102. A first motor 106 is attached to trolley 104 and is operatively coupled to track 102. Operation of first motor 106 causes trolley 104 to move along track 102.

A second motor 108 is mounted on trolley 104 and is operatively coupled to a first end 110 of a flexible drive cable 112. Particularly, second motor 108 is coupled to a gear box 114 which is coupled to a drive shaft 116 by a shaft coupling 118. Drive shaft 116 is attached to first end 110 of flexible drive cable 112. A tool head 120 is coupled to a second end 122 of flexible cable 112. Operation of second motor 108 rotates drive cable 112 around the longitudinal axis of drive cable 112. Operation of first motor 106 causes trolley 104 to move along track 102 which causes tool head 120 to be moved to various positions in RPV 10. Typically, frame structure 84 is attached to RPV 10 so that frame member 86 is positioned vertically along RPV side wall 16. Consequently, the movement of trolley 104 along vertically orientated track 102 changes the vertical location of tool head 120 in RPV 10. A motion controller (not shown) is operatively coupled to trolley 104 and monitors the movement and position of tool head 120. Any known suitable motion controller can be used.

Figure 4:
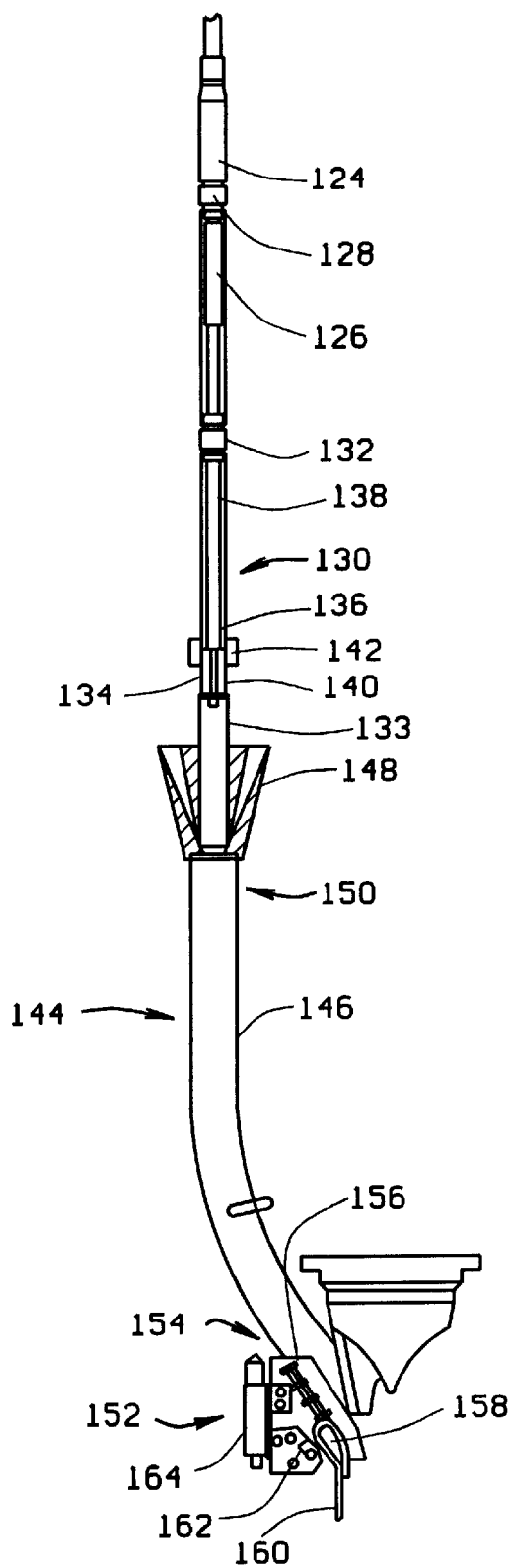
FIG. 4 is a side view of the tool head of the inspection apparatus shown in FIG. 3.

FIG. 4 is a side view of tool head 120 of inspection apparatus 82. Tool head 120 includes a first portion 124 coupled to a second portion 126 by a first flexible U-joint 128, and a probe subassembly 130 coupled to second portion 126 by a second flexible U-joint 132. A calibration sleeve 133 is coupled to the end of probe subassembly 130.

Probe subassembly 130 includes a probe housing 134 and three probe arms 136 (one shown) pivotably coupled to housing 134 at a first end 138 of each probe arm 136. Each probe arm 136 includes a sensor 140 coupled to a second end 142 of each probe arm 136.

Inspection apparatus 82 includes an insertion subassembly 144 that couples to suction inlet 68 of jet pump 62. Insertion subassembly 144 is sized to receive tool head 120 and connected flexible drive cable 112 and guide tool head 120 into jet pump 62 through suction inlet 68. Insertion subassembly 144 includes an elongate tube portion 146, a location cone 148 attached to a first end 150 of tube portion 146, and an attachment clamp 152 attached to a second end 154 of tube portion 146. Attachment clamp 152 is configured to clamp to jet pump 62 at suction inlet 68. Particularly, attachment clamp 152 includes a plate 156 coupled to tube portion 143. Plate 156 includes a notch 158 sized to receive a side wall 160 of jet pump 62. Attachment clamp 152 further includes an engagement arm 162 pivotably coupled to plate 152, and a ratchet assembly 164 coupled to engagement arm 162. Engagement arm 162 is moved into engagement with jet pump side wall 160 by tightening ratchet assembly 164.

Figure 5:
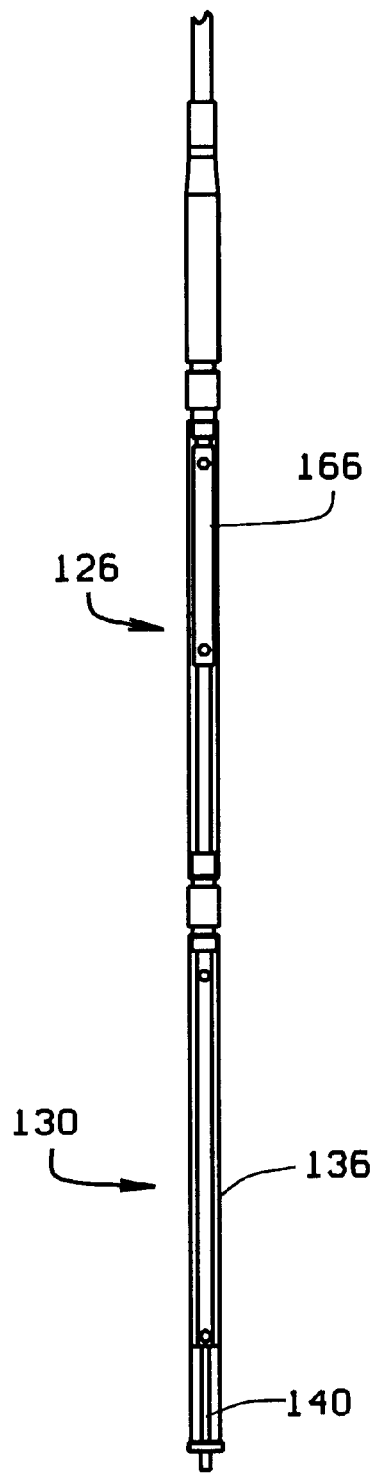
FIG. 5 is a side view of the tool head shown in FIG. 4 with the probe arms in a fully retracted position.
Figure 6:
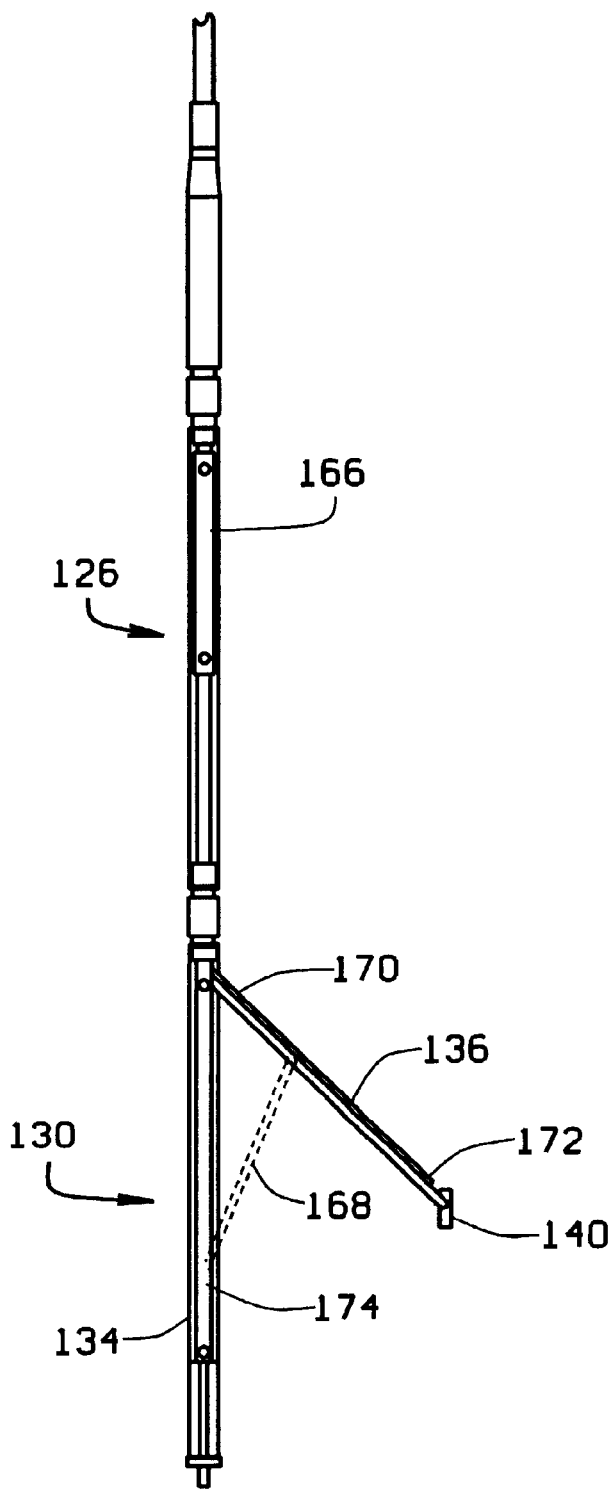
FIG. 6 is a side view of the tool head shown in FIG. 4 with the probe arms in a fully extended position.

Referring to FIGS. 5 and 6, probe arms 136 are pivotably movable between a first position (shown in FIG. 5) where probe arms 136 are parallel to the longitudinal axis of probe subassembly 130, and a second position (shown in FIG. 6) where probe arms 136 are at an angle to the longitudinal axis of probe subassembly 130. In the second position, sensors 140 contact the inner surface of jet pump 62 to inspect weld joints 80. A pneumatic cylinder 166, located in tool head second portion 126 is operatively coupled to probe arms through probe support arms 168. Support arms 168 are pivotably coupled to probe arms 136 between a first end 170 and a second end 172 of probe arms 136. Support arms 168 are also slidably coupled to probe housing 134 and operatively coupled to pneumatic cylinder 166. The activation of pneumatic cylinder 166 causes support arms 168 to slide along a track 174 attached to probe housing 130 which causes probe arms 136 to move between the first position (see FIG. 5) and the second position (see FIG. 6).

Sensors 140 are ultrasonic transducer probes or eddy current transducer probes. Particularly, probe subassembly 130 can contain any combination of ultrasonic transducer probes and/or eddy current transducer probes depending on the desired inspection, i.e., volumetric inspection and/or surface inspection. Calibration sleeve 133 includes a notch on the inner surface to check the parameters of an eddy current signal, and a notch on the outer surface to check the parameters of an ultrasonic transducer signal to ensure optimal working parameters during weld inspection. A complete calibration of sensors 140 is done before installation of inspection apparatus 82 into jet pump 62.

To inspect weld joints 80, inspection apparatus 82 is installed in RPV 10 by securing attachment frame member 88 to RPV top flange 18 with a top head bolt 98. After installation, elongate frame member 86 is in a vertical position with support wheel 92 engaging RPV side wall 16.

Insertion subassembly 144 is installed on jet pump 62 by positioning tube portion 146 in suction inlet 68 with jet pump side wall 160 located in notch 158 of plate 156. Ratchet assembly 164 is then tightened to move engagement arm into engagement with sidewall 160 to clamp insertion subassembly 144 in place.

Probe subassembly 304 is then positioned adjacent the jet pump weld joint 80 that is to be scanned by activating first motor 106 to move trolley 104 along track 102 causing flexible drive cable 112 and tool head 120 to extend from the bottom of frame structure 84 and move vertically downward toward insertion subassembly 144 mounted on jet pump 62. Tool head 130 is inserted into location cone 148 and is guided through tube portion 146 and into jet pump 62. At the predetermined vertical position adjacent to weld joint 80, first motor 106 is stopped. Probe arms 136 are then extended by activating pneumatic cylinder which causes support arms 168 to slide along track 174 which causes probe arms 136 to pivot into scanning position with sensors 140 in contact with the inner surface of side wall 160 of jet pump 62.

To scan weld joint 80, second motor 108 is activated to rotate flexible drive cable 112 around its axis which causes sensors 140 to move circumferentially around weld joint 80. A data acquisition system (not shown) is used to record the scan data from sensors 140. Second motor 108 is stopped when the scan is complete. Probe arms 136 are then retracted at least partially so that sensors 140 are not in contact with side wall 160. First motor then actuated to move trolley 104 which causes probe subassembly 130 to move to a different location adjacent an other weld joint 80. Probe arms 136 are then extended as described above and the desired weld joint 80 is scanned as described above.

To remove inspection apparatus 82 from RPV 10, probe arms 136 are fully retracted and trolley 104 is moved vertically upward to cause tool head 130 to exit jet pump 62 through tube portion 146 of insertion subassembly 144. After tool head 130 has been fully retracted, insertion subassembly 1044 is removed from jet pump 62 by loosening ratchet assembly 164 which causes engagement arm 162 to move away from side wall 160 of jet pump 62. Insertion subassembly 144 can then be lifted from jet pump 62. Frame structure 84 is then removed by removing top head bolt 98 and lifting frame structure from RPV 10 by utilizing lifting eye 100.

The above described inspection apparatus 82 performs ultrasonic and/or eddy current examinations of jet pump weld joints 80 from inside jet pump inlet mixer 70 and diffuser 72 in nuclear reactor 10 without having to disassemble jet pump 62. Also inspection apparatus 82 is remotely operable and can scan multiple weld joints 80 with a single insertion into jet pump 62.

While the invention has been described in terms of various specific embodiments, those skilled in the art will recognize that the invention can be practiced with modification within the spirit and scope of the claims.

What is claimed is:

1. An inspection apparatus for inspecting welds in a nuclear reactor jet pump, the jet pump comprising an inlet mixer and a diffuser, the nuclear reactor comprising a reactor pressure vessel having a top flange, said inspection apparatus comprising:

a frame structure configured to attach to a top flange of a reactor pressure vessel;

a motor mounted to said frame structure;

a flexible drive cable operatively coupled to said first motor;

a tool head coupled to said flexible cable, said tool head comprising a probe subassembly, said probe subassembly rotatable around a longitudinal axis of said tool head, said probe subassembly comprising a probe housing and a plurality of probe arms, each said probe arm having a first end and a second end, each said probe arm pivotably coupled to said housing at said first end of said probe arm, each said probe arm comprising a sensor coupled to said second said sensor comprising an ultrasonic transducer probe or an eddy current transducer probe, end of said probe arm, said probe arms said sensor comprising an ultrasonic transducer probe or an eddy current transducer probe, pivotably movable between a first position and a second position, in said first position, said probe arms are parallel to a longitudinal axis of said probe subassembly, in said second position said probe arms are at an angle to said longitudinal axis of said probe subassembly; and an insertion subassembly configured to couple to a jet pump suction inlet, said insertion subassembly sized to receive said tool head and said flexible drive cable and guide said tool head and flexible drive cable into the jet pump suction inlet, said insertion subassembly comprising an elongate tube portion having a first end and a second end, a location cone attached to said first end of said tube portion, and an attachment clamp configured to clamp to the jet pump suction inlet.

2. An inspection apparatus in accordance with claim 1 wherein said frame structure comprises:

an elongate frame member having a first end portion and a second end portion;

an attachment frame member extending from said first end portion of said elongate frame member, said attachment frame member configured to attach to the top flange of the reactor; and a support wheel coupled to said second end portion of said elongate frame member.

3. An inspection apparatus in accordance with claim 2 wherein said frame structure further comprises:

an elongate track attached to said elongate frame member; and a trolley movably coupled to said track, said motor mounted on said trolley, said motor capable of rotating said drive cable around the longitudinal axis of said drive cable, said axial rotation of said drive cable causing said probe subassembly to rotate around the longitudinal axis of said tool head.

4. An inspection apparatus in accordance with claim 1 wherein said tool head further comprises a first portion coupled to a second portion by a first flexible U-joint, said second portion coupled to said probe subassembly by a second flexible U-joint.

5. An inspection apparatus in accordance with claim 1 wherein said probe subassembly comprises three probe arms.

6. An inspection apparatus in accordance with claim 1 wherein said attachment clamp comprises a plate coupled to said second end of said tube portion, said plate comprising a notch sized to receive an end of the jet pump suction inlet.

7. An inspection apparatus in accordance with claim 6 wherein said attachment clamp further comprises an engagement arm pivotably coupled to said plate and a ratchet assembly coupled to said engagement arm, said engagement arm movable into engagement with the jet pump suction inlet by tightening said ratchet assembly.

8. An inspection apparatus for inspecting welds in a nuclear reactor jet pump, the jet pump comprising an inlet mixer and a diffuser, the nuclear reactor comprising a reactor pressure vessel having a top flange, said inspection apparatus comprising:

a frame structure configured to attach to a top flange of a reactor pressure vessel;

a motor mounted to said frame structure;

a flexible drive cable operatively coupled to said first motor;

a tool head coupled to said flexible cable, said tool head comprising a probe subassembly rotatable around a longitudinal axis of said tool head, said probe subassembly comprising:

a probe housing; and three probe arms, each said probe arm having a first end and a second end, each said probe arm pivotably coupled to said housing at said first end of said probe arm, each said probe arm comprising a sensor coupled to said second end of said probe arm, said probe arms said sensor comprising an ultrasonic transducer probe or an eddy current transducer probe, pivotably movable between a first position and a second position, in said first position, said probe arms are parallel to a longitudinal axis of said probe subassembly, in said second position said probe arms are at an angle to said longitudinal axis of said probe subassembly; and an insertion subassembly configured to couple to a jet pump suction inlet, said insertion subassembly sized to receive said tool head and said flexible drive cable and guide said tool head and flexible drive cable into the jet pump suction inlet said insertion subassembly comprising an elongate tube portion having a first end and a second end, a location cone attached to said first end of said tube portion, and an attachment clamp configured to clamp to the jet pump suction inlet.

9. An inspection apparatus in accordance with claim 8 wherein said frame structure comprises:

an elongate frame member having a first end portion and a second end portion;

an attachment frame member extending from said first end portion of said elongate frame member, said attachment frame member configured to attach to the top flange of the reactor; and a support wheel coupled to said second end portion of said elongate frame member.

10. An inspection apparatus in accordance with claim 9 wherein said frame structure further comprises:

an elongate track attached to said elongate frame member; and a trolley movably coupled to said track, said motor mounted on said trolley, said motor capable of rotating said drive cable around the longitudinal axis of said drive cable, said axial rotation of said drive cable causing said probe subassembly to rotate around the longitudinal axis of said tool head.

11. An inspection apparatus in accordance with claim 8 wherein said tool head further comprises a first portion coupled to a second portion by a first flexible U-joint, said second portion coupled to said probe subassembly by a second flexible U-joint.

12. An inspection apparatus in accordance with claim 8 wherein said attachment clamp comprises a plate coupled to said second end of said tube portion, said plate comprising a notch sized to receive an end of the jet pump suction inlet.

13. An inspection apparatus in accordance with claim 12 wherein said attachment clamp further comprises an engagement arm pivotably coupled to said plate and a ratchet assembly coupled to said engagement arm, said engagement arm movable into engagement with the jet pump suction inlet by tightening said ratchet assembly.

* * * * *

UNITED STATES PATENT AND TRADEMARK OFFICE
CERTIFICATE OF CORRECTION

PATENT NO. : 6,526,114 B2
DATED : February 25, 2003
INVENTOR(S) : Paillaman et al.

It is certified that error appears in the above-identified patent and that said Letters Patent is hereby corrected as shown below:

Column 1,
Line 48, delete "irradiation assisted" and insert therefor -- irradiation-assisted --.

Column 5,
Line 61, delete "sidewall" and insert therefor -- side wall --.
Line 63, delete "304" and insert therefor -- 130 --.

Column 6,
Line 27, delete "1044" and insert therefor -- 144 --
Line 65, after "sensor coupled to said second" delete "said sensor comprising an ultrasonic transducer probe or an eddy current transducer probe,".
Line 67, after "said probe arm," insert -- said sensor comprising an ultrasonic transducer probe or an eddy current transducer probe, --.

Column 7,
Line 1, after "arms" delete "said sensor comprising an ultrasonic transducer probe or an eddy current transducer probe,".

Column 8,
Line 10, after "coupled to said second end of said probe arm," insert -- said sensor comprising an ultrasonic transducer probe or an eddy current transducer probe, --.
Line 11, after "probe arms," delete "said sensor comprising an ultrasonic transducer probe or an eddy current transducer probe,".

Signed and Sealed this

Twelfth Day of August, 2003

JAMES E. ROGAN
*Director of the United States Patent and Trademark Office*